(12) United States Patent
Robertson et al.

(10) Patent No.: US 12,158,306 B2
(45) Date of Patent: Dec. 3, 2024

(54) MELTING FURNACE PURGE SYSTEM AND METHOD

(71) Applicant: Fives North American Combustion, Inc., Cleveland, OH (US)

(72) Inventors: Thomas F. Robertson, Medina, OH (US); Douglas A. Clauss, Copley, OH (US)

(73) Assignee: Fives North American Combustion, Inc., Cleveland, OH (US)

( * ) Notice: Subject to any disclaimer, the term of this patent is extended or adjusted under 35 U.S.C. 154(b) by 601 days.

(21) Appl. No.: 17/327,216

(22) Filed: May 21, 2021

(65) Prior Publication Data

US 2022/0373261 A1 Nov. 24, 2022

(51) Int. Cl.
| | |
|---|---|
| *F27D 25/00* | (2010.01) |
| *C22B 9/00* | (2006.01) |
| *C22B 9/05* | (2006.01) |
| *F27B 3/22* | (2006.01) |
| *F27B 14/08* | (2006.01) |
| *F27D 1/00* | (2006.01) |
| *F27D 3/00* | (2006.01) |
| *F27D 3/14* | (2006.01) |
| *F27D 7/02* | (2006.01) |
| *F27D 7/06* | (2006.01) |
| *C03B 5/43* | (2006.01) |
| *C03B 18/20* | (2006.01) |
| *F27B 7/20* | (2006.01) |

(52) U.S. Cl.
CPC ........... *F27D 25/008* (2013.01); *C22B 9/006* (2013.01); *C22B 9/05* (2013.01); *F27B 3/22* (2013.01); *F27D 1/0006* (2013.01); *F27D 3/0024* (2013.01); *F27D 3/0025* (2013.01); *F27D 3/14* (2013.01); *F27D 7/02* (2013.01); *F27D 7/06* (2013.01); *C03B 5/43* (2013.01); *C03B 18/20* (2013.01); *F27B 7/2083* (2013.01); *F27B 2014/0843* (2013.01); *F27D 2007/023* (2013.01)

(58) Field of Classification Search
CPC .................................. F27B 3/22; C03B 18/20
See application file for complete search history.

(56) References Cited

U.S. PATENT DOCUMENTS

| | | | |
|---|---|---|---|
| 4,770,697 A | 9/1988 | Zurecki | |
| 4,989,501 A | 2/1991 | Catan | |
| 5,195,888 A | 3/1993 | Sharma et al. | |
| 5,518,221 A | 5/1996 | Zurecki et al. | |
| 5,961,689 A * | 10/1999 | Kobayashi | F27B 3/205 |
| | | | 75/654 |
| 8,191,607 B2 | 6/2012 | Cho et al. | |

(Continued)

OTHER PUBLICATIONS

Clear, Level eleven surface area to volume ratio (Year: 2013).*
Industrial Heating, Tips on good refractory practice for aluminum melting furnaces (Year: 2002).*

*Primary Examiner* — Michael G Hoang
*Assistant Examiner* — Kurt J Wolford
(74) *Attorney, Agent, or Firm* — Benesch Friedlander Coplan & Aronoff LLP

(57) ABSTRACT

A furnace has a melting chamber with a periphery defined by a surrounding wall structure. The furnace is provided with a purge system configured to direct inert gas to flow downward in the melting chamber in the configuration of a curtain that adjoins the wall structure and reaches only partially around the periphery of the melting chamber.

17 Claims, 4 Drawing Sheets

(56) References Cited

U.S. PATENT DOCUMENTS

| | | |
|---|---|---|
| 2004/0060389 A1 | 4/2004 | Roth et al. |
| 2008/0182022 A1* | 7/2008 | La Sorda ................ C22B 9/006 |
| | | 427/248.1 |
| 2011/0120852 A1* | 5/2011 | Kim .......................... F27D 7/02 |
| | | 202/99 |
| 2011/0268891 A1 | 11/2011 | MacNeil et al. |
| 2015/0367409 A1 | 12/2015 | Tilak et al. |
| 2019/0162473 A1* | 5/2019 | Clauss .................... F27B 14/14 |

* cited by examiner

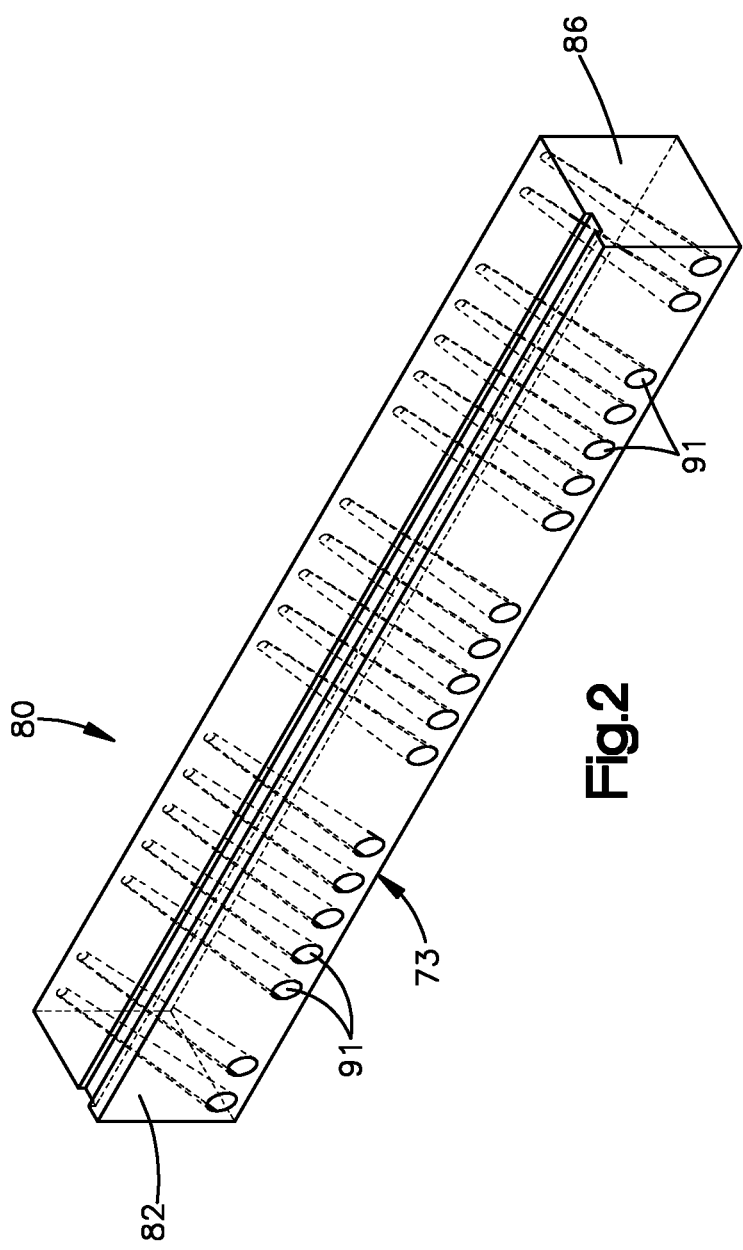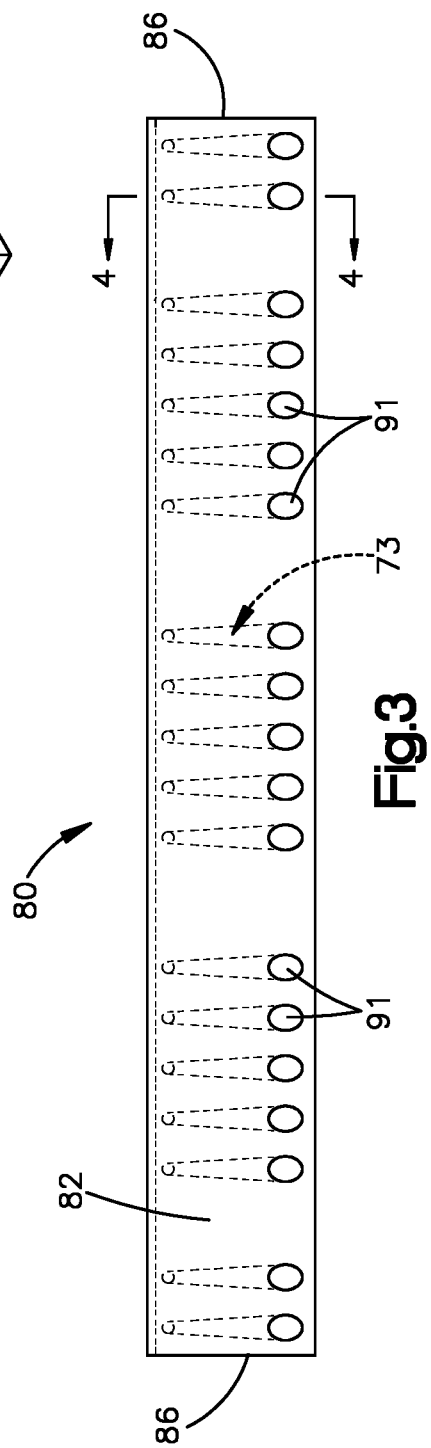

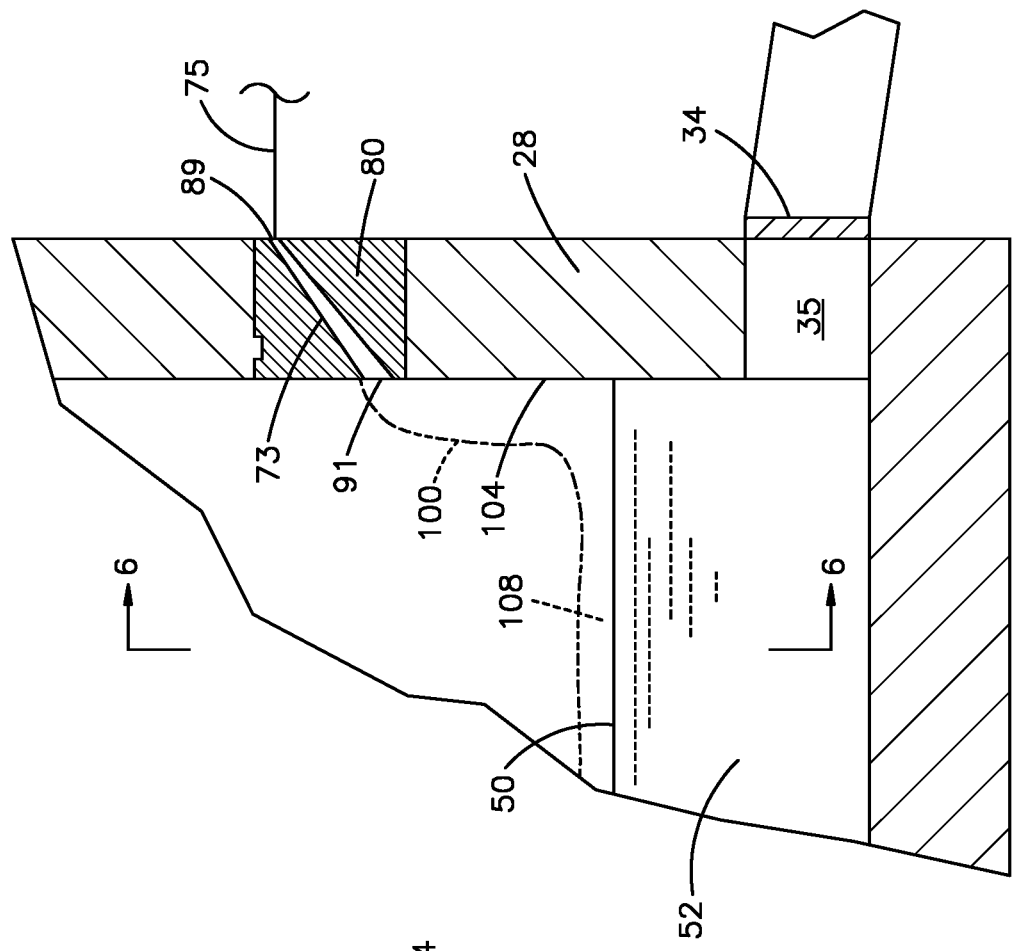
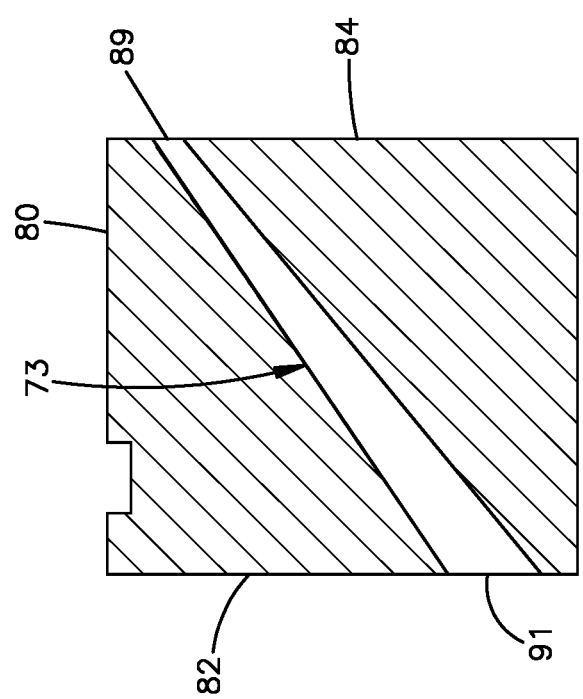

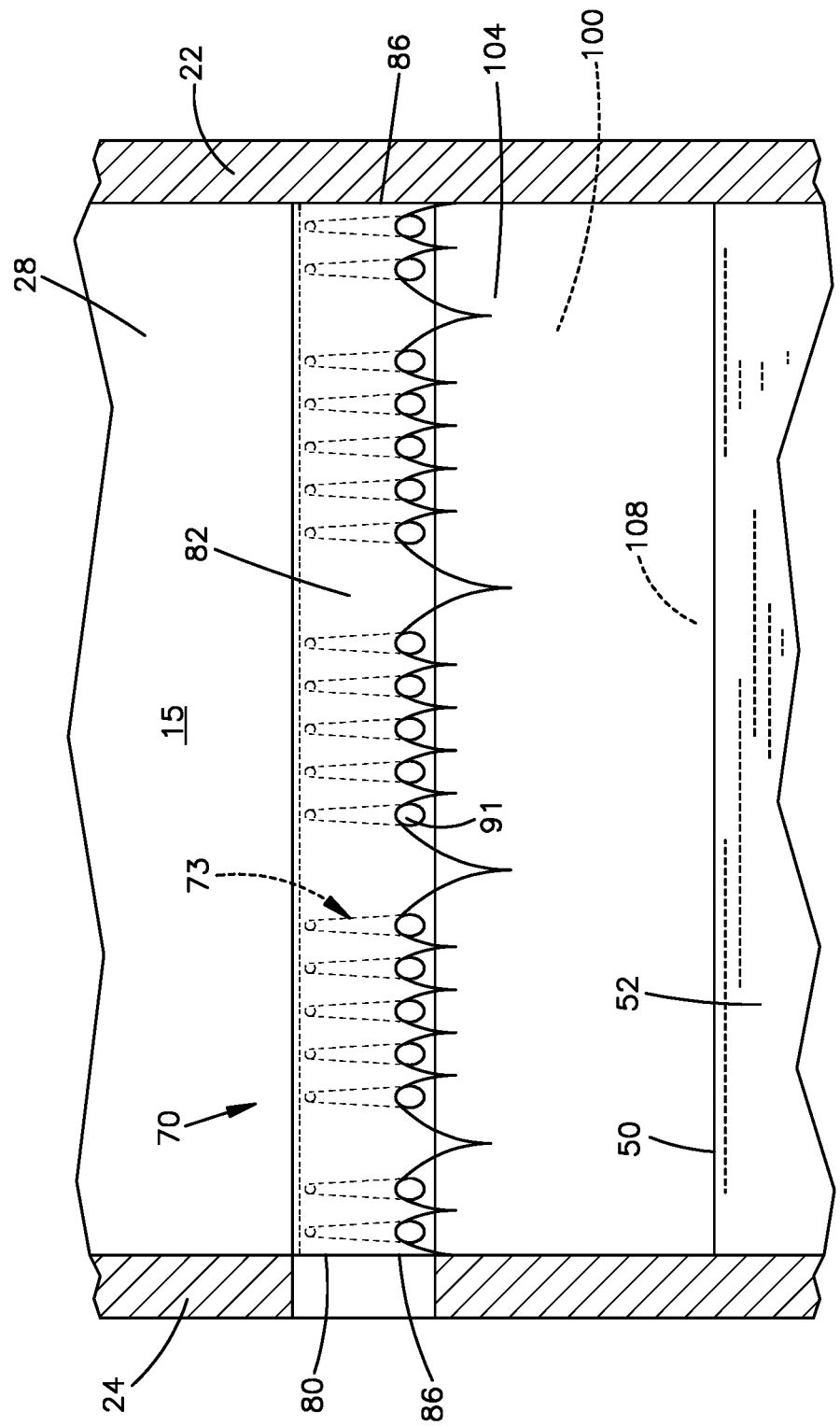

MELTING FURNACE PURGE SYSTEM AND METHOD

TECHNICAL FIELD

This technology includes furnaces for melting metal to form alloys.

BACKGROUND

Alloys can be formed by casting mixtures of molten metals. When the metals are being melted in a furnace, it may be desirable to inhibit the formation of oxides and nitrides in the molten metal by shielding it from the atmosphere in the furnace. This is typically accomplished by injecting inert gas into the furnace to purge the furnace of air.

SUMMARY

A furnace has a melting chamber with a periphery defined by a surrounding wall structure. The furnace is provided with a purge system configured to direct inert gas to flow downward in the melting chamber in the configuration of a curtain that adjoins the wall structure and reaches only partially around the periphery of the melting chamber.

In operation, the melting chamber is provided with an atmosphere including air. Inert gas is directed to flow downward in the melting chamber in the configuration of a curtain that adjoins the wall structure and reaches only partially around the periphery of the melting chamber. The inert gas forms an upper surface by flowing horizontally from a lower end of the curtain, and increases in depth such that the upper surface rises in the melting chamber to displace the air from the melting chamber.

BRIEF DESCRIPTION OF THE DRAWINGS

FIG. 2 is a perspective view of a part of the furnace.
FIG. 3 is a front view of the part shown in FIG. 3.
FIG. 4 is a sectional view taken on line 4-4 of FIG. 4.
FIG. 5 is an enlarged sectional view of the furnace.
FIG. 6 is a view taken on line 6-6 of FIG. 5.

DETAILED DESCRIPTION

Figure 1:
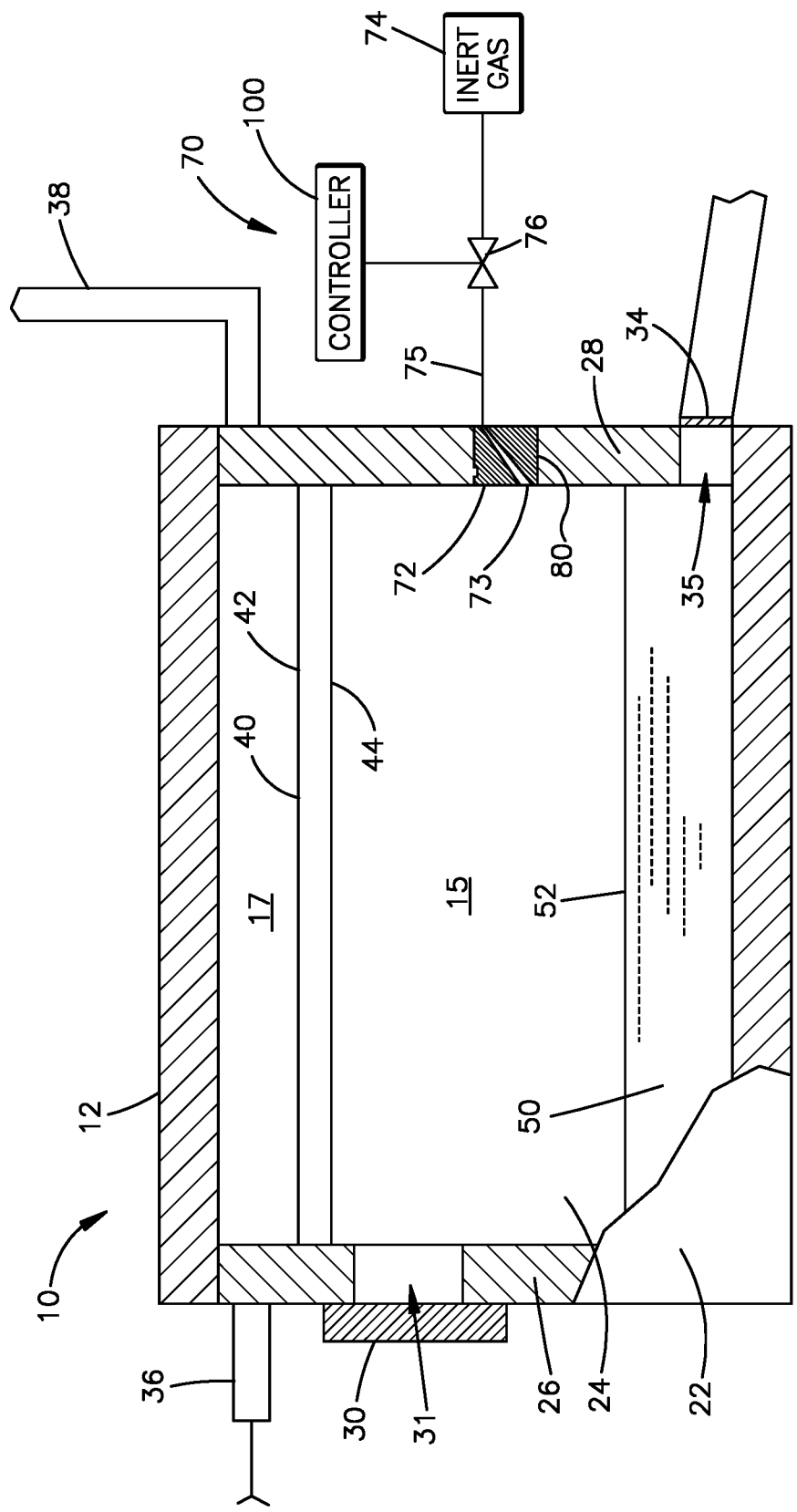
FIG. 1 is schematic side sectional view of a melting furnace.

The structures shown in the drawings includes examples of the elements recited in the apparatus claims, and can be operated in steps as recited in the method claims. These examples are described to provide enablement and best mode without imposing limitations that are not recited in the claims.

As shown schematically in FIG. 1, a melting furnace 10 has a wall structure 12 defining a melting chamber 15 and a combustion chamber 17. The wall structure 12 provides the melting chamber 15 with a rectangular, with opposite side walls 22 and 24 reaching between a front wall 26 and a rear wall 28. A door 30 at the front wall 26 is supported for movement over a charge port 31 through which metal pieces are loaded into the melting chamber 15. Another door 34 at the rear wall 28 is supported for movement over a discharge port 35 through which molten metal is drained from the melting chamber 15. A burner 36 is arranged to fire into the combustion chamber 17 to provide heat for melting the load. Products of combustion are directed outward from the combustion chamber 17 to a stack 38.

The combustion chamber 17 is sealed from gas flow communication with the melting chamber 15. This shields the molten metal from the products of combustion that are generated in the combustion chamber 17. The sealed condition is established in part by an internal furnace wall 40 that separates the melting chamber 15 from the combustion chamber 17.

In addition to separating the two chambers 15 and 17, the internal wall 40 functions as a radiant heating panel for transferring thermal energy from the combustion chamber 17 to the load in the melting chamber 15. The internal wall 40 thus has an upper surface 42 facing into the combustion chamber 17, and has a lower surface 44 facing into the melting chamber 15. The lower surface 44 functions as a radiant heating surface at the top of the melting chamber 15 to raise the melting chamber 15 to an elevated temperature in atmospheric isolation from the combustion chamber 17.

When a charge of metal is being melted, a surface 50 of the melt 52 forms and rises in the melting chamber 15. The surface 50 is thus exposed to the atmosphere within the chamber 15. That atmosphere is normally air, which can promote the formation of oxides and nitrides that weaken alloys formed from the melted metals. Alloys formed from melts of aluminum and lithium are especially susceptible to this weakening effect. Accordingly, the furnace 10 is equipped with an atmospheric purging system 70 to isolate the melt 52 from the air in the chamber 15.

The purging system 70 in the given example includes a diffuser 72 at the rear wall 28 of the furnace 10. The diffuser 72 has an array of passages 73. A source 74 of inert gas, which is preferably argon, communicates with the passages 73 through one or more lines 75 with valves 76.

The diffuser 72 is a refractory block 80 in the rear wall 28. As shown in greater detail in FIGS. 2-4, the block 80 has an elongated rectangular configuration with front and rear sides 82 and 84 extending lengthwise between opposite ends 86. The passages 73 are arranged in a horizontal row along the length of the block 80, with each having an upstream port 89 at the rear side 84 and a downstream port 91 at the front side 82. The flow area at the downstream port 91 is greater than the flow area at the upstream port 89. As shown, each passage 73 is inclined downward from the upstream port 89 toward the downstream port 91, and has a tapered conical shape such that the flow area increases uniformly in the downstream direction.

A controller 100 operates the valves 76 to direct streams of argon from the source 74 to the passages 73 at the diffuser 72. The valves 76 provide the argon streams at a pressure that is greatly reduced from the tank storage pressure. Preferably, the reduced pressure exceeds the pressure of the melting chamber atmosphere only as needed for the argon streams to flow through the passages 73 and penetrate the chamber volume beside the downstream ports 91. The increasing flow areas of the passages 73 ensure that the argon streams emerge from the ports 91 at a low velocity. Additionally, the density of the argon is greater than the density of the melting chamber air, whereby the argon streams pour through the inclined passages 73 and then sink directly downward from the ports 91. This avoids entrainment of oxygen and nitrogen from the surrounding air into the argon streams.

With the ports 91 arranged closely in the horizontal row, the sinking argon streams merge into the configuration of a curtain 100 flowing slowly downward in the melting chamber 15. The curtain 100 adjoins a surface portion 104 of the rear wall 28 beneath the ports 91 as shown schematically in FIG. 5, and preferably reaches across the rear wall 28 fully from one side wall 22 to the other 24 as schematically in FIG. 6. When the descending curtain 100 reaches the surface 50 of the melt 52, the argon further flows horizontally from the rear wall 28 to the front wall 26 in the configuration of a layer 108 overlying the melt surface 50 beneath the heated air in the melting chamber 15. Such shielding of the melt surface 50 may be continued until the rising thickness of the argon layer 108 fully purges the air from the chamber 15.

Importantly, the curtain 100 reaches only partially around the periphery of the melting chamber. This limits the surface area of interface between the inert gas and the furnace atmosphere, which helps to minimize shear stresses that could cause turbulence and mixing of the inert gas and the furnace atmosphere at the interface. Preferably, the curtain 100 reaches around not more than one half of the periphery of the melting chamber, and more preferably reaches around not more than quarter of the periphery of the melting chamber.

This written description sets for the best mode of carrying out the invention, and describes the invention so as to enable a person of ordinary skill in the art to make and use the invention, by presenting examples of the elements and steps recited in the claims. The patentable scope of the invention is defined by the claims, and may include other examples that do not differ from the literal language of the claims, as well as equivalent examples with insubstantial differences from the literal language of the claims.

What is claimed is:

1. An apparatus comprising:
   a furnace configured to melt metal pieces, the furnace comprising a melting chamber with a periphery defined by a surrounding wall structure, a charge port configured for entry of the metal pieces into the melting chamber, and a discharge port configured to drain molten metal from the melting chamber;
   a source of an inert gas; and
   a purge system communicating with the source of inert gas, wherein the purge system comprises a port structure only at a distal end of the melting chamber away from the charge port, wherein the purge system is configured to direct the inert gas from the source to flow through the port structure downward in the melting chamber in a configuration of a curtain that adjoins the wall structure in only a portion of the periphery of the melting chamber distal to the charge port to limit a surface area of an interface between the inert gas and an atmospheric gas in the melting chamber, the purge system is further configured to slowly flow the inert gas such that an upper surface of the inert gas rises in the melting chamber to displace the atmospheric gas from the melting chamber.

2. An apparatus as defined in claim 1 wherein the portion is not more than one half of the periphery of the melting chamber.

3. An apparatus as defined in claim 1 wherein the portion is not more than one quarter of the periphery of the melting chamber.

4. An apparatus as defined in claim 1 wherein the port structure comprises ports at the distal end of the melting chamber away from the charge port.

5. An apparatus as defined in claim 4 wherein the ports are located vertically between the charge port and the discharge port.

6. An apparatus as defined in claim 4 wherein the ports are arranged in a row reaching horizontally along the wall structure.

7. An apparatus as defined in claim 1 wherein the purge system includes a passage with a downstream flow area open to the melting chamber at the wall structure, and an upstream flow area recessed from the melting chamber, with the upstream flow area being less than the downstream flow area.

8. An apparatus as defined in claim 7 wherein the passage is tapered with a flow area that increases progressively from the upstream flow area to the downstream flow area.

9. An apparatus as defined in claim 7 wherein the passage is inclined downward toward the downstream flow area.

10. The apparatus of claim 1, wherein the metal pieces comprise lithium.

11. The apparatus of claim 1, wherein the inert gas comprises argon.

12. An apparatus comprising:
    a furnace structure defining a melting chamber, a charge port configured for entry of metal pieces comprising lithium into the melting chamber, and a discharge port configured to drain molten metal from the melting chamber, including a block of refractory material having a surface within the melting chamber at a peripheral boundary of the melting chamber;
    a source of an inert gas comprising argon; and
    a port structure communicating with the source of inert gas, wherein the port structure is only at a distal end of the melting chamber away from the charge port to limit a surface area of an interface between the inert gas and an atmospheric gas in the melting chamber, and the port structure is open at the surface of the block and is configured to direct the inert gas downward over the surface of the block.

13. An apparatus as defined in claim 12 wherein the port structure includes multiple ports arranged in a row reaching horizontally across the surface of the block.

14. An apparatus as defined in claim 13 wherein the port structure includes a passage with a downstream flow area at the surface of the block, and an upstream flow area recessed from the surface of the block, with the upstream flow area being less than the downstream flow area.

15. An apparatus as defined in claim 14 wherein the passage is tapered with a flow area that increases progressively from the upstream flow area to the downstream flow area.

16. An apparatus as defined in claim 14 wherein the passage is inclined downward to the downstream flow area.

17. An apparatus as defined in claim 12, wherein the melting chamber is a rectangular chamber surrounded by the wall structure comprising opposite side walls reaching between a front wall and a rear wall, wherein the charge port is at the front wall and the port structure is at the rear wall.

* * * * *